United States Patent
Moro

(10) Patent No.: US 11,517,078 B2
(45) Date of Patent: Dec. 6, 2022

(54) LOCK FASTENER

(71) Applicants: NITTA MOLD CORPORATION, Koka (JP); KASAI KOGYO CO., LTD., Kanagawa (JP)

(72) Inventor: Takumi Moro, Koka (JP)

(73) Assignees: NITTA MOLD CORPORATION, Koka (JP); KASAI KOGYO CO., LTD., Koza-gun (JP)

( * ) Notice: Subject to any disclaimer, the term of this patent is extended or adjusted under 35 U.S.C. 154(b) by 203 days.

(21) Appl. No.: 17/041,317

(22) PCT Filed: Feb. 18, 2020

(86) PCT No.: PCT/JP2020/006177
§ 371 (c)(1),
(2) Date: Sep. 24, 2020

(87) PCT Pub. No.: WO2020/175227
PCT Pub. Date: Sep. 3, 2020

(65) Prior Publication Data
US 2021/0076785 A1  Mar. 18, 2021

(30) Foreign Application Priority Data

Feb. 25, 2019 (JP) .............................. JP2019-031542
Mar. 29, 2019 (JP) .............................. JP2019-065918

(51) Int. Cl.
A44B 18/00 (2006.01)
B60R 13/02 (2006.01)

(52) U.S. Cl.
CPC ...... *A44B 18/0049* (2013.01); *A44B 18/0061* (2013.01); *A44B 18/0069* (2013.01); *B60R 13/02* (2013.01)

(58) Field of Classification Search
CPC .. A44B 18/0049; A44B 18/0061; B60R 13/02
See application file for complete search history.

(56) References Cited

U.S. PATENT DOCUMENTS 7,048,984 B2 * 5/2006 Seth ................... A44B 18/0084
428/105
7,246,416 B2 * 7/2007 Duffy ................. A44B 18/0061
24/444

(Continued)

FOREIGN PATENT DOCUMENTS

JP       S57-84243 A    5/1982
JP       H08-238112 A   9/1996

(Continued)

OTHER PUBLICATIONS

Apr. 21, 2020 Search Report issued in International Patent Application No. PCT/JP2020/006177.

(Continued)

*Primary Examiner* — Jason W San
(74) *Attorney, Agent, or Firm* — Oliff PLC

(57) ABSTRACT

A lock fastener that can be easily manufactured to have great fastening ability includes a touch fastener and a base member insert-molded to the touch fastener. The base member is formed with a space adapted to be filled with a resin material at a time of insert-molding, and the space includes an opening formed in a surface of the base member. The opening is surrounded by a peripheral wall part of the surface. The peripheral wall part is adapted to abut a base of the touch fastener at the time of insert molding and to serve as a bank for preventing the resin material filled into the space from leaking.

11 Claims, 13 Drawing Sheets

(56) References Cited

U.S. PATENT DOCUMENTS

| | | | | |
|---|---|---|---|---|
| 7,695,057 | B2* | 4/2010 | Autterson | A44B 18/0073 296/214 |
| 8,424,587 | B1* | 4/2013 | Dubay | B29C 45/34 164/410 |
| 8,756,770 | B2* | 6/2014 | Cina | A44B 18/0065 428/99 |
| 8,960,251 | B2* | 2/2015 | Tanno | B29D 30/0061 24/444 |
| 9,474,338 | B2* | 10/2016 | Sachee | A44B 18/0073 |
| 10,188,179 | B2* | 1/2019 | Sachee | A44B 18/0073 |
| 2005/0253293 | A1* | 11/2005 | Cathcart | B29C 33/10 249/141 |
| 2008/0222856 | A1* | 9/2008 | Poulakis | A44B 18/0076 24/452 |
| 2015/0101156 | A1* | 4/2015 | Sachee | A44B 18/0073 24/446 |
| 2016/0242513 | A1* | 8/2016 | Sachee | A44B 18/0046 |
| 2019/0047198 | A1* | 2/2019 | Alemany Negrete | B29C 45/76 |

FOREIGN PATENT DOCUMENTS

| | | |
|---|---|---|
| JP | 2000-139519 A | 5/2000 |
| JP | 2005-145112 A | 6/2005 |
| JP | 2015-2794 A | 1/2015 |
| WO | 2014205036 A1 | 12/2014 |

OTHER PUBLICATIONS

Apr. 21, 2020 Written Opinion of the International Searching Authority issued in International Patent Application No. PCT/JP2020/006177.

Jun. 15, 2022 Office Action issued in Chinese Patent Application No. 202080001912.4.

* cited by examiner (a)

(b)

LOCK FASTENER

TECHNICAL FIELD

The present invention relates to lock fasteners.

BACKGROUND

Lock fasteners are used for lining sheet materials (ceiling sheet materials, for example) onto interior surfaces of vehicles, for example. A lock fastener disclosed in Patent Document 1 includes a touch fastener (a male touch fastener, for example) and a base member fixed on a rear surface of the touch fastener with adhesive. The touch fastener has a large number of engaging members formed on its front surface.

In order to line a ceiling material onto a ceiling of a vehicle, for example, a plurality of lock fasteners is fixed onto the ceiling, and a large number of engaged members of the ceiling material is engaged with the engaging members of the lock fasteners.

RELATED ART

Patent Document

Patent Document 1: Japanese Patent-Application Publication No. 2005-145112

SUMMARY

Problems to be Solved by Invention

The above-mentioned conventional lock fastener is manufactured by attaching the touch fastener onto the base member with adhesive, and there is a danger that the adhesive overflows to the front side of the touch fastener and reaches a space between the engaging members. When the adhesive flows into the space between the engaging members in this manner, then the space is partially filled with the adhesive, deteriorating fastening ability of the lock fastener.

Also, it is conceivable to manufacture such lock fasteners by attaching a touch fastener onto a front surface of a base member with adhesive one at a time. This attaching process is, however, a time consuming and increases manufacturing costs. Instead of such a manufacturing method, it is conceivable to attach a large-sized touch fastener onto a large-sized base member with adhesive and then cut it into desired-sized pieces. The cutting process is, however, time consuming and increases manufacturing costs as well.

It is an object of the invention to provide lock fasteners that can be easily manufactured to have great fastening ability.

Means to Achieve the Objects

A lock fastener according to a first aspect of the invention includes: a base member; and a touch fastener including a base and a plurality of engaging members formed on the base, wherein: the base member has been insert-molded integrally with the base using a resin material; the base member has a surface formed with an opening and having a peripheral wall part extending continuously along entire outer peripheral edges of the surface, the peripheral wall part surrounding the opening; the base member is formed with a space adapted to be filled with the resin material at the time of insert-molding, the space including the opening; and the peripheral wall part of the base member is adapted to abut the base of the touch fastener at the time of insert molding and to serve as a bank for preventing the resin material filled into the space from leaking.

A width of the peripheral wall part is preferably between 0.01 mm and 5.0 mm.

A lock fastener according to a second aspect of the invention includes: a base member; and a touch fastener including a base and a plurality of engaging members formed on the base, wherein: the base member has been insert-molded integrally with the base using a resin material; the base member has a surface formed with a plurality of openings and at least one communication groove; the base member is formed with a space adapted to be filled with the resin material at the time of insert-molding, the space including the plurality of openings; and the plurality of openings includes a pair of openings in fluid communication with each other through the at least one communication groove.

All of the plurality of openings are preferably in fluid communication with one another through the at least one communication groove.

The plurality of openings is preferably four rectangular-shaped openings formed at an inner side than peripheral edges of the surface in a lattice arrangement.

The surface of the base member is preferably formed with a plurality of air-discharge channels corresponding to the plurality of openings; the base member is preferably formed with an air outlet hole penetrating through the base member, the air outlet hole being in a fluid communication with the plurality of openings through the plurality of air-discharge channels; and at the insert molding, air in the plurality of openings preferably flows through the plurality of air-discharge channels into the air outlet hole.

A lock fastener according to a third aspect of the invention includes: a base member; and a touch fastener including a base and a plurality of engaging members formed on the base, wherein: the base member has been insert-molded integrally with the base using a resin material; the base member has a surface formed with at least one opening and at least one air-discharge channel; the base member is formed with a space adapted to be filled with the resin material at the time of insert-molding and at least one air-outlet hole penetrating through the base member, the space including the at least one opening; and at the time of insert molding, air in the at least one opening flows through the at least one air-discharge channel into the at least one air-outlet hole.

The at least one opening preferably includes four openings in a lattice arrangement; the surface of the base member preferably has a peripheral wall part extending continuously along entire peripheral edges of the surface, the peripheral wall part surrounding the four openings; and the at least one air-outlet hole preferably includes an air-outlet hole formed at a center of the four openings.

The at least one opening preferably includes four openings in a lattice arrangement, the four openings including a pair of openings located adjacent to each other and a pair of second openings located adjacent to each other; the surface of the base member preferably has a peripheral wall part extending continuously along entire peripheral edges of the surface, the peripheral wall part surrounding the four openings; the at least one air-outlet hole preferably includes a first air-outlet hole corresponding to the pair of first openings and a second air-outlet hole corresponding to the pair of second openings; and at the time of insert molding, air in the pair of first openings preferably flows into the first air-outlet hole, and air in the pair of second openings flows into the second air-outlet hole.

The at least one air-outlet hole is preferably adapted to be fluidly connected to an external vacuum source through a vacuum channel formed in a mold at the time of insert molding.

ADVANTAGEOUS EFFECTS OF THE INVENTION

According to one aspect of the invention, the base member is formed with the space including the opening formed in the surface of the base member. Thus, the base member is insert-molded to the base of the touch fastener by filling the space with resin while the base of the touch fastener is in abutment with the surface of the base member. Also, the surface of the base member has the support wall part extending along the outer peripheral edges, and the support wall part prevents the resin from leaking out from the opening to the engaging members of the touch fastener. Thus, it is possible to provide lock fasteners with great fastening ability.

According to a different aspect of the invention, air in the plurality of openings flows through the plurality of air discharge channels into the port at the time of insert-molding. Thus, air does not remain between the base member and the touch fastener, realizing reliable insert-molding of the base member to the touch fastener.

EMBODIMENT

Figure 1:
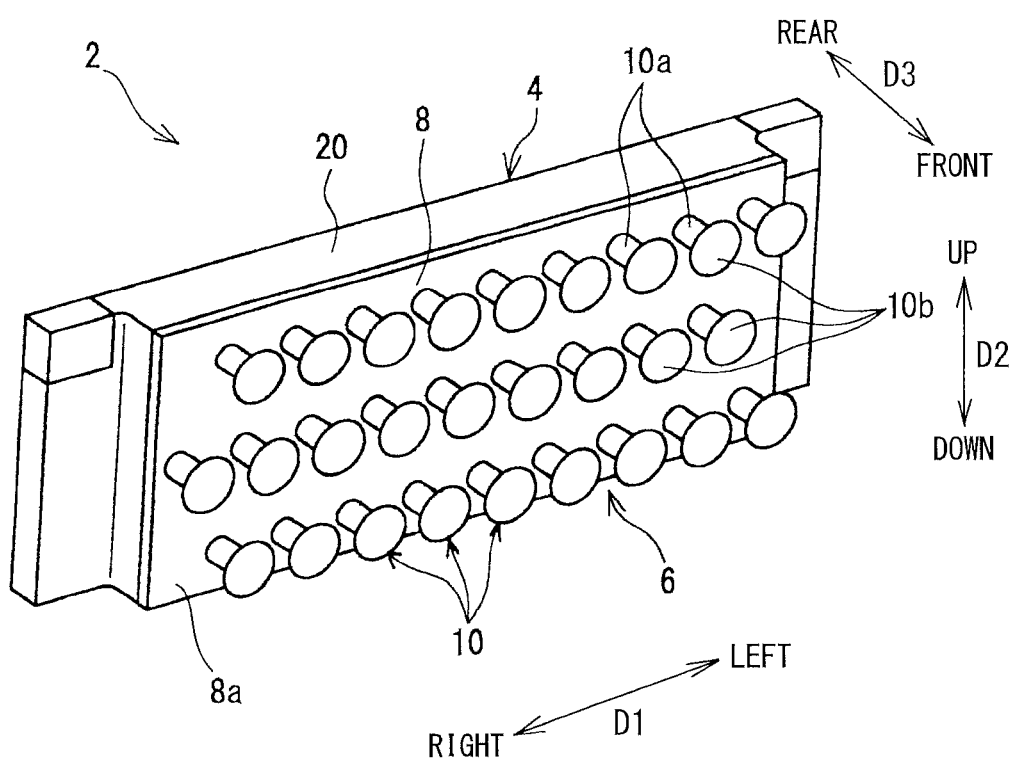
FIG. 1 is a perspective view of a lock fastener according to an embodiment of the invention as viewed from a front side.
Figure 2:
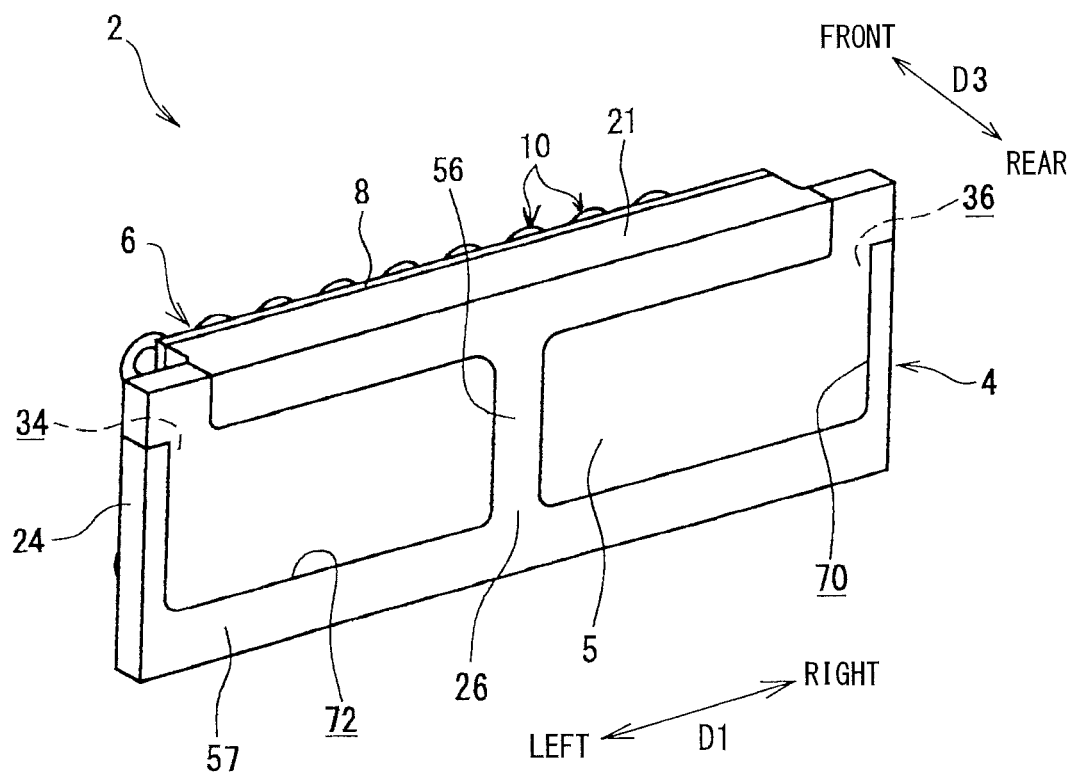
FIG. 2 is a perspective view of the lock fastener of FIG. 1 as viewed from a rear side.

A lock fastener according to an embodiment of the invention will be described while referring to the accompanying drawings. As shown in FIGS. 1 and 2, a lock fastener 2 of this embodiment includes a base member 4 and a touch fastener 6 insert-molded to the base member 4. That is, the base member 4 and the touch fastener 6 are integrally joined together by insert molding using a resin material (resin 5).

The touch fastener 6 is made of synthetic resin (polyolefin resin, for example) by molding and includes a base 8 and a plurality (a large number) of engaging members 10. For example, the base 8 is integrally formed with the engaging members 10. The base 8 has a front surface (first surface) 8a and a rear surface (second surface) 8b. The plurality of engaging members 10 is formed on the front surface 8a of the base 8. Each engaging member 10 is in a mushroom-like shape having a leg part 10a extending from the front surface 8a of the base 8 and a head part 10b formed at a tip end of the leg part 10a. The head part 10b is larger in diameter than the leg part 10a.

Figure 3:
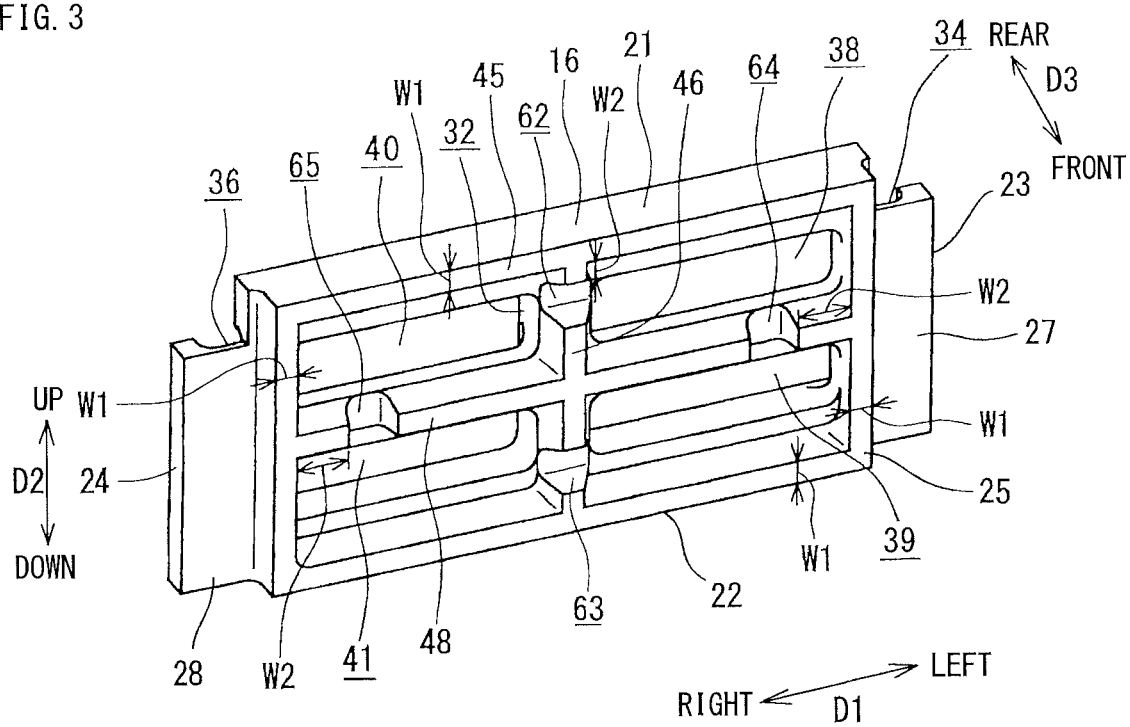
FIG. 3 is a perspective view of a base member of the lock fastener of FIG. 1 as viewed from the front side.
Figure 4:
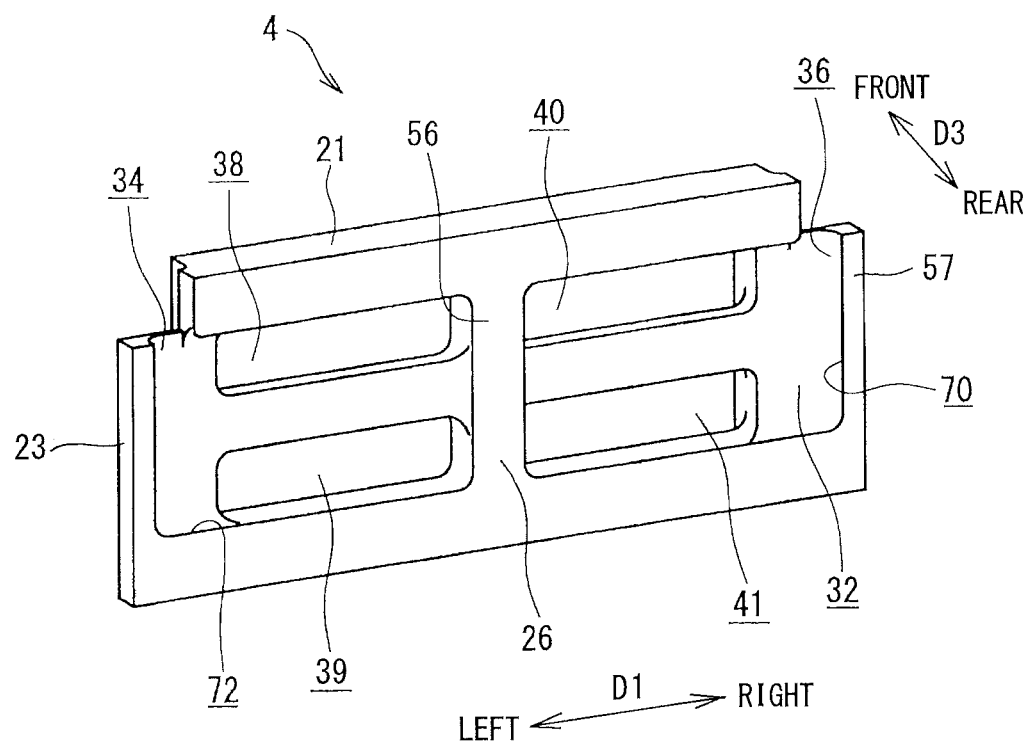
FIG. 4 is a perspective view of the base member of FIG. 3 as viewed from the rear side.

With reference to FIGS. 3 and 4, the base member 4 is in a substantially rectangular shape in the front view and has an upper surface 21, a lower surface 22, a left side surface 23, a right side surface 24, a front surface 25, a rear surface 26, a left-side recessed surface 27 between the left side surface 23 and the front surface 25, and a right-side recessed surface 28 between the right side surface 24 and the front surface 25.

For example, the base member 4 is integrally made of such synthetic resin as ABS resin, unsaturated polyester resin, and the like. It is desirable to use unsaturated polyester resin and the like when glass fibers or the like are added to enhance strength.

The front surface 25 of the base member 4 is formed with at least one opening. In this embodiment, the front surface 25 is formed with four openings 38, 39, 40, 41 as shown in FIG. 3. In this embodiment, the front surface 25 of the base member 4 is also formed with four communication grooves 62, 63, 64, 65 fluidly communicating the openings 38 to 41 with one another. The base member 4 is also formed with a pair of openings 70, 72 in the rear surface 26. The opening 70 is opened to the openings 40, 41 in a front-rear direction D3, and the opening 72 is opened to the openings 38, 39 in the front-rear direction D3.

The openings 38 to 41, the communication grooves 62 to 65, and the openings 70, 72 together function as a space 32. The base 8 of the touch fastener 6 is integrally joined to the front surface 25 of the base member 4 with the resin 5 filled and cured in the space 32 by insert molding to be described later.

Figure 5:
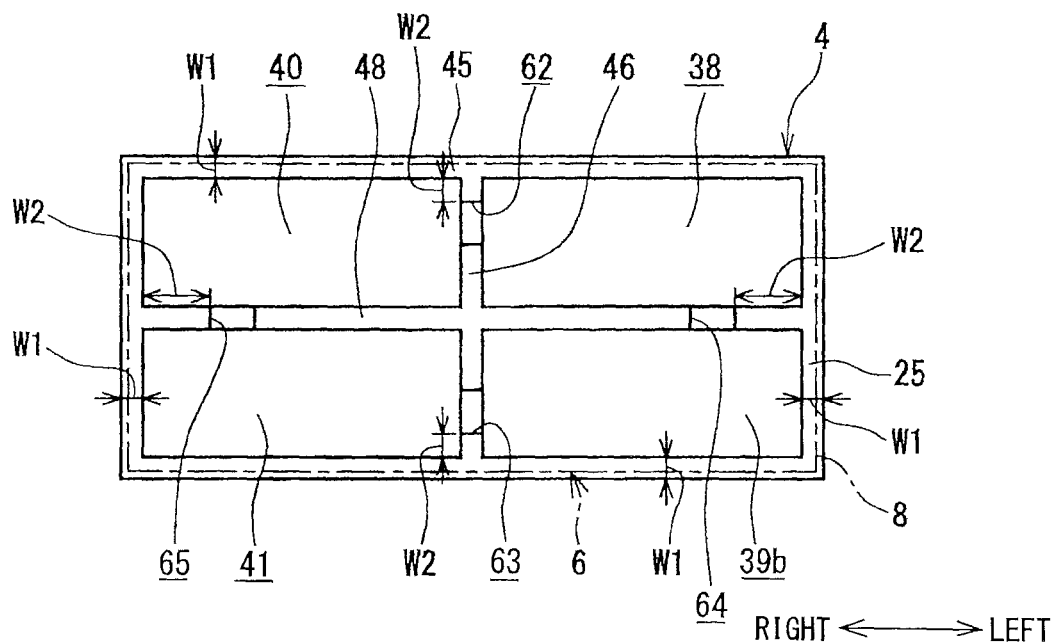
FIG. 5 is a front view of the base member of FIG. 3 with a touch fastener in phantom.

As shown in FIG. 5, a contour of the front surface 25 of the base member 4 corresponds to a contour of the rear surface 8b of the base 8 of the touch fastener 6, and has substantially the same size as the rear surface 8b of the base 8. It should be noted that the front surface 25 is depicted in FIG. 5 slightly larger than the rear surface 8b of the base 8 for leading to a better understanding.

The base member 4 is also formed with a pair of inlets 34, 36 opened to the space 32. The inlet 34 on the left side is formed at a corner between the upper surface 21 and the left side surface 23, and the inlet 36 on the right side is formed at a corner between the upper surface 21 and the right side surface 24. At the insert molding, the resin material (resin 5)

is filled into the space 32 through the inlets 34, 36. It should be noted that although the resin material is filled into the space 32 through the two inlets 34, 36 in this embodiment, it is preferable to fill the space 32 with the resin material through one inlet or more than two inlets in a different embodiment.

Next, the openings 38 to 41, the communication grooves 62 to 65, and the openings 70, 72 will be described in detail. As shown in FIG. 3, the openings 38 to 41 have substantially the same size and are formed in a lattice arrangement at an inner side than peripheral edges of the front surface 25 of the base member 4. In other words, the front surface 25 of the base member 4 has a peripheral wall part 45 surrounding the openings 38 to 41, a vertical middle part 46 extending in an up-down direction D2, and a horizontal middle part 48 extending in a right-left direction D1. The vertical middle part 46 and the horizontal middle part 48 partition between the openings 38 to 41.

That is, the openings 38 and 39 on the left side are spaced away from the openings 40 and 41 on the right side in the right-left direction D1 with the vertical middle part 46 therebetween, and the openings 38 and 40 on the upper side are spaced away from the openings 39 and 41 on the lower side in the up-down direction D2 with the horizontal middle part 48 therebetween.

Figure 7:
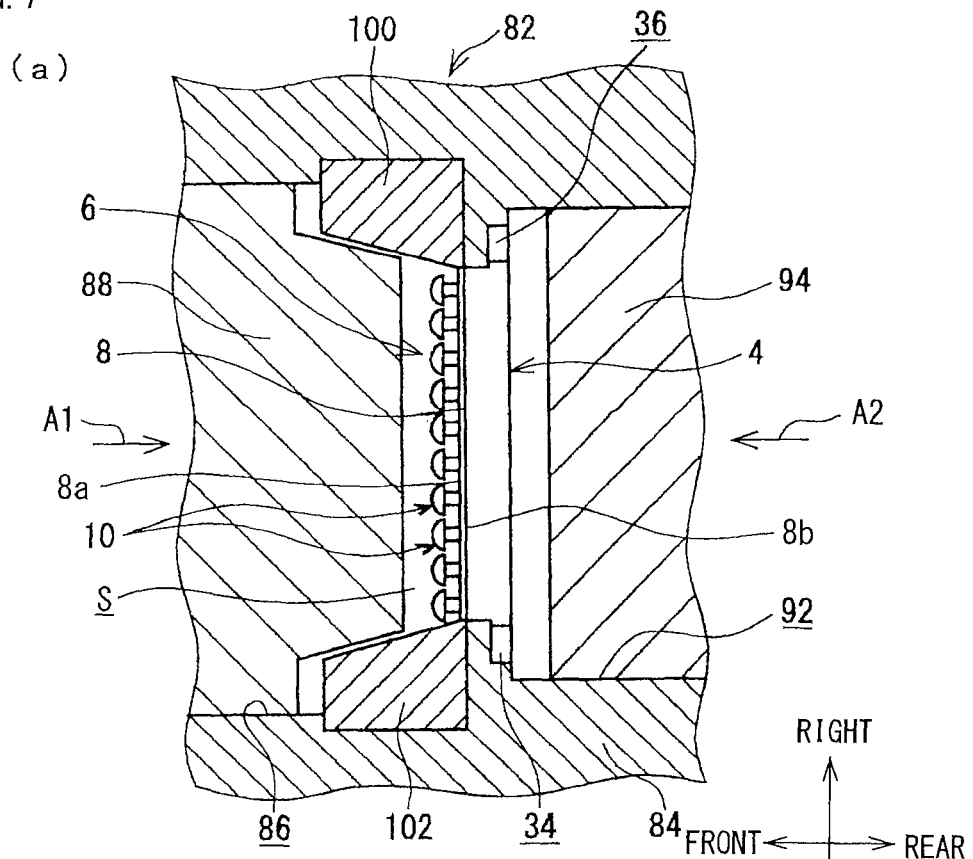
FIG. 7 is a cross-sectional view of a mold device for insert-molding the base member of FIG. 3 to the touch fastener, wherein (a) is a view showing the mold device in an open condition, and (b) is a view showing the mold device in a closed condition.
Figure 7:
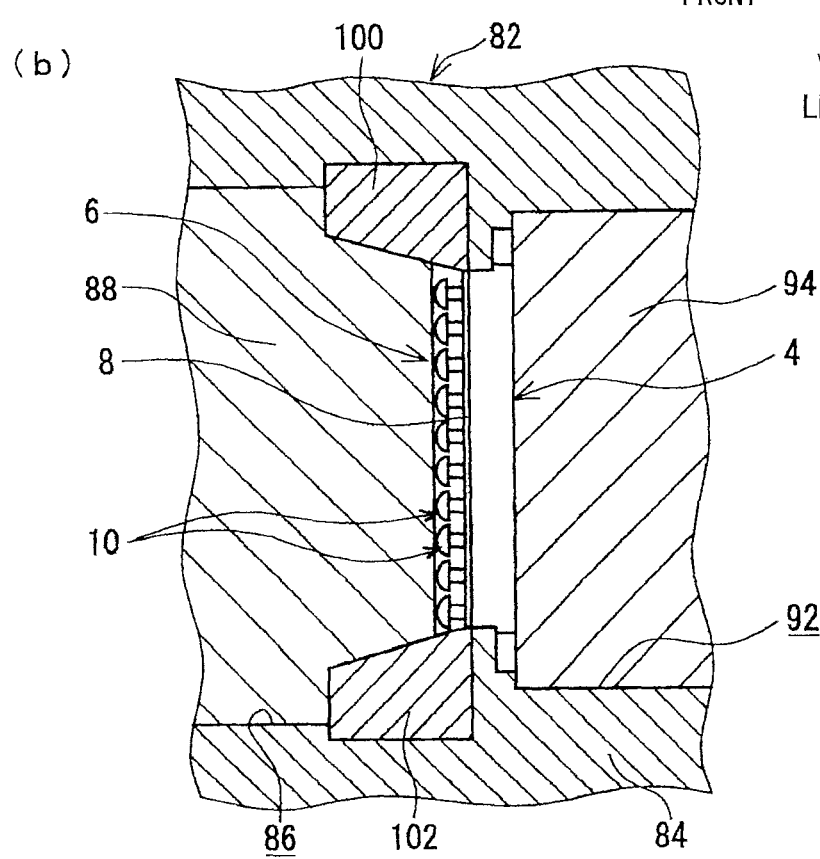

The peripheral wall part 45, the vertical middle part 46, and the horizontal middle part 48 are flush with one another and function as a support wall part for supporting the rear surface 8b of the touch fastener 6 (see FIG. 7(a)).

The peripheral wall part 45 is in a rectangular ring shape in the front view and extends continuously along the entire peripheral edges of the front surface 25. A width W1 (FIGS. 3 and 5) of the peripheral wall part 45 is preferably 0.01 mm to 5.0 mm, and more preferably 0.1 mm to 4.0 mm. If the width W1 of the peripheral wall part 45 is smaller than 0.01 mm, then there is a danger that the resin material overflows beyond the peripheral wall part 45 at the time of insert molding. If the width W1 exceeds 5.0 mm, on the other hand, then there is a danger that the total area of the openings 38 to 41 (that is, contact areas between the resin 5 cured in the openings 38 to 41 and the touch fastener 6) is insufficient, weakening the bonding between the base member 4 and the touch fastener 6.

The communication groove 62 is formed at an upper part in the vertical middle part 46 to fluidly communicate the openings 38 and 40 in the right-left direction D1, and the communication groove 63 is formed at a lower part in the vertical middle part 46 to fluidly communicate the openings 39 and 41 in the right-left direction D1. The communication groove 64 is formed at a left part in the horizontal middle part 48 to fluidly communicate the openings 38 and 39 in the up-down direction D2, and the communication groove 65 is formed at a right part in the horizontal middle part 48 to fluidly communicate the openings 40 and 41 in the up-down direction D2.

The communication grooves 62 to 65 are preferably formed at positions slightly away from the peripheral wall part 45. A distance W2 between the peripheral wall part 45 and each of the communication grooves 62 to 65 (see FIGS. 3 and 5) is preferably 0.8 mm or greater and more preferably 1.2 mm or greater. If the distance W2 is smaller than 0.8 mm, then there is a danger that the resin material flowing through the communication grooves 62 to 65 overflows beyond the peripheral wall part 45 at the time of insert molding.

As shown in FIG. 4, the pair of openings 70, 72 is formed in the rear surface 26 of the base member 4 at an inner side than peripheral edges of the rear surface 26. In other words, the rear surface 26 of the base member 4 has a peripheral wall part 57 surrounding the openings 70, 72 and a vertical middle part 56 extending in the up-down direction D2. The openings 70, 72 are disposed away from each other in the right-left direction D1 with the vertical middle part 56 interposed therebetween. The peripheral wall part 57 and the vertical middle part 56 of the rear surface 26 of the base member 4 are flush with each other.

Next, a method for insert molding the base member 4 to the touch fastener 6 will be described. In this insert molding method, a molding device 82 shown in FIGS. 7(a) and 7(b) is used, for example. The molding device 82 includes a stationary mold 84, a first movable mold 88, a second movable mold 94, and a pair of auxiliary molds 100 and 102. The stationary mold 84 has a front surface (one surface) formed with a first opening 86, and the first movable mold 88 is disposed in the first opening 86 so as to be freely movable in a direction indicated by an arrow A1. Also, the stationary mold 84 has a rear surface (the other surface) formed with a second opening 92, and the second movable mold 94 is disposed in the second opening 92 so as to be freely movable in a direction indicated by an arrow A2. The auxiliary molds 100 and 102 are disposed on left and right sides in the first opening 86, respectively.

When the molding device 82 is in an open state as shown in FIG. 7(a), the stationary mold 84, the first and second movable molds 88 and 94, and the pair of auxiliary molds 100 and 102 together define a space S for accommodating the base member 4 and the touch fastener 6.

In the insert molding, the base member 4 and the touch fastener 6 are inserted from the above into the space S of the molding device 82 in the open state as shown in FIG. 7(a). That is, the touch fastener 6 is inserted between the auxiliary molds 100 and 102 from the above such that the plurality of engaging members 10 (i.e., the front surface 8a of the base 8) faces the first movable mold 88, and the base member 4 is inserted into the space S from the above such that the rear surface 26 (i.e., the openings 70 and 72) faces the second movable mold 94.

Then, the first and second movable molds 88 and 94 are moved in the directions indicated by the arrows A1 and A2, respectively, to perform mold clamping. In this mold clamping state, as shown in FIG. 7(b), the stationary mold 84 and the pair of auxiliary molds 100 and 102 prevent the touch fastener 6 and the base member 4 from moving in the right-left direction D1, and the first movable mold 88 prevents the touch fastener 6 from moving frontward (in a direction opposite to the direction indicated by the arrow A1), and the second movable mold 94 prevents the base member 4 from moving rearward (in a direction opposite to the direction indicated by the arrow A2). As a result, the rear surface 8b of the touch fastener 6 abuts the front surface 25 of the base member 4, and thus the base 8 (the rear surface 8b of the base 8) of the touch fastener 6 is supported on the front surface 25 of the base member 4 (i.e., the peripheral wall part 45, the vertical middle part 46, and the horizontal middle part 48 of front surface 25 (the support wall part)).

In this state, the resin material (uncured resin 5) is filled in the space 32 of the base member 4 through the pair of inlets 34, 36. The touch fastener 6 and the base member 4 are integrated with each other upon the resin material cured.

That is, the resin material poured through the inlets 34 and 36 flows through the openings 70, 72 and the openings 38 to 41 to the rear surface 8b of the base 8 of the touch fastener 6. At this time, because the peripheral wall part 45 of the front surface 25 of the base member 4 is pressed against and in direct contact with the base 8 of the touch fastener 6, the resin material poured into the space 32 of the base member 4 is prevented from flowing to the engaging members 10 over the peripheral wall part 45. That is, the peripheral wall part 45 of the base member 4 functions as a bank to keep the resin material from leaking and becomes a non-molded region with no resin 5. The peripheral wall part 45 having the width W1 of 0.01 or more (more preferably 0.1 mm or more) as described above effectively prevents the resin material from leaking out of the space 32.

Also, because the openings 38 to 41 of the base member 4 are fluidly connected to one another through the communication grooves 62 to 65, if a resin pressure near the opening 38 becomes higher than a resin pressure near the remaining openings 39 to 41, for example, then part of the resin material near the opening 38 flows into the openings 39 to 41 through the communication grooves 62 to 65. This suppresses increase in the resin pressure near the opening 38 and prevents breakage of the touch fastener 6 near the opening 38.

In this manner, if the resin pressure increases near any of the openings 38 to 41, the resin material flows through the communication grooves 62 to 65. Thus, an excessively large pressure is not applied on parts of the base 8 of the touch fastener 6 and does not cause damage to the touch fastener 6.

For example, the base member 4 of the lock fastener 2 used for attaching an interior material (e.g., a sheet-shaped ceiling material) to a vehicle has a length of about 8 mm to 30 mm in the up-down direction D2, a width of about 20 mm to 50 mm in the right-left direction D1, and a thickness of about 2.5 mm to 5.0 mm in the front-rear direction D3, and thus the space 32 of the base member 4 is relatively small. Therefore, if the base member 4 is not formed with the communication grooves 62 to 65, then a slight fluctuation in pouring pressure of the resin material possibly increases greatly the pressure against the touch fastener 6. In this embodiment, however, because all of the openings 38 to 41 are fluidly connected with one another through the communication grooves 62 to 65, such fluctuation in pouring pressure of the resin material hardly increases the pressure against a section of the touch fastener 6, preventing damage to the touch fastener 6.

Figure 6:
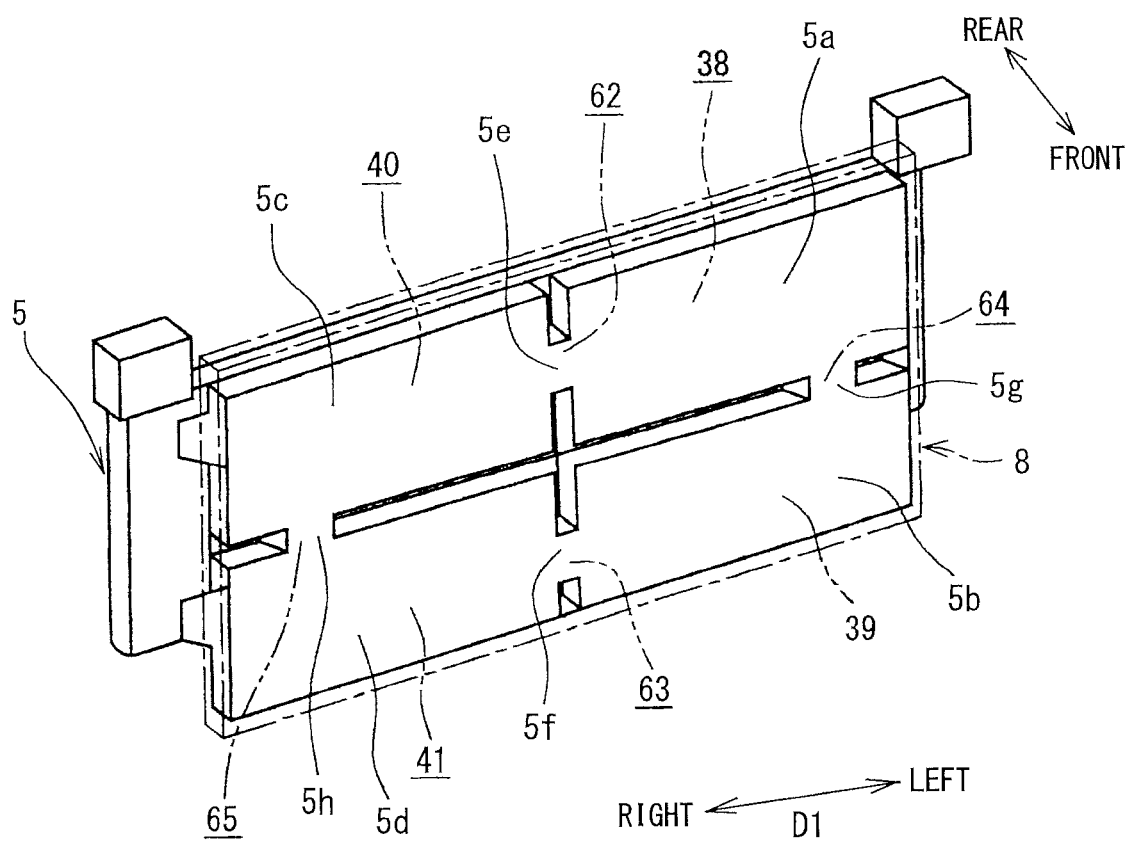
FIG. 6 is a perspective view of a resin filled and cured in the base member of FIG. 3 as viewed from the rear side with the touch fastener in phantom.

With reference to FIG. 6, among the resin material filled in the space 32 of the base member 4 in the above-described manner, resin 5a, 5b, 5c, 5d filled in the openings 38, 39, 40, 41, respectively, and resin 5e, 5f, 5g, 5h filled in the communication grooves 62, 63, 64, 65, respectively, bond the base member 4 onto the base 8 of the touch fastener 6. It is preferable that resin material be excellent in adhesive property and rigidity. The resin material is preferably acrylic resin, epoxy resin, or the like.

As described above, because the lock fastener 2 of the present embodiment is formed by insert molding the touch fastener 6 with the base member 4, the touch fastener 6 is reliably bonded on the base member 4, and manufacturing costs thereof are lowered.

In order to attach interior materials (not shown) onto a vehicle (not shown) using the lock fastener 2 of the present embodiment, for example, a plurality of the lock fasteners 2 is fixed by adhesive to the vehicle (or a rail or the like attached to the vehicle), and then the lock fasteners 2 are engaged with lock fasteners formed on the interior materials.

It should be noted that although the molding device 82 includes the two movable molds 88 and 94 in this embodiment, it is preferable that one of the molds 88 and 94 be a stationary mold in a different embodiment.

Also, in a different embodiment, it is preferable that the rear surface 26 of the base member 4 be formed with a communication groove in the vertical middle part 56 at the center thereof in the up-down direction D2 in order to fluidly communicate the openings 70 and 72.

In the present embodiment, the two openings 70, 72 are formed in the rear surface 26 of the base member 4. In a different embodiment, however, it is preferable that four openings, instead of the openings 70 and 72, be formed in the similar manner as in the front surface 25.

Next, first to fourth modifications of the embodiment will be described in this order. It should be noted that parts and components of those modifications substantially the same as those of the above embodiment are designated by the same reference numerals, and explanation thereof will be omitted.

Figure 8:
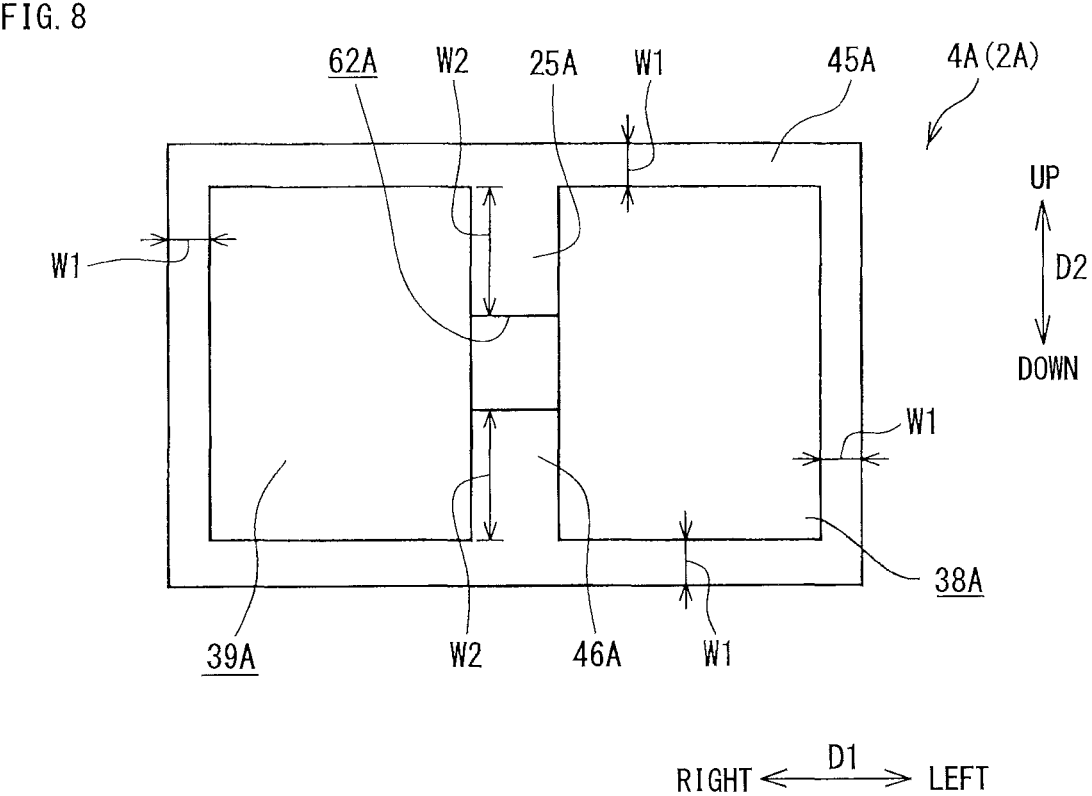
FIG. 8 is a front view of a base member of a lock fastener according to a first modification of the embodiment of the present invention.

First, a lock fastener according to the first modification of the embodiment will be described with reference to FIG. 8. As shown in FIG. 8, a lock fastener 2A according to this modification includes a base member 4A having a front surface 25A formed with a pair of openings 38A and 39A. The openings 38A and 39A are formed at an inner side than peripheral edges of the front surface 25A. In other words, the front surface 25A of the base member 4A has a rectangular-ring shaped peripheral wall part 45A surrounding the openings 38A and 39A, and a vertical middle part 46A extending in the up-down direction D2. The vertical middle part 46A partitions between the openings 38A and 39A. That is, the opening 38A on the left side and the opening 39A on the right side are disposed away from each other in the right-left direction D1 with the vertical middle part 46A therebetween.

The peripheral wall part 45A and the vertical middle part 46A are flush with each other and function as the support wall part for supporting the rear surface 8b of the touch fastener 6 (FIG. 7(a)).

The peripheral wall part 45A is in a rectangular ring shape in the front view and extends continuously along the entire peripheral edges of the front surface 25A. The peripheral wall part 45A has the same width W1 as in the embodiment.

The front surface 25A of the base member 4A is also formed with a communication groove 62A. The communication groove 62A is formed at a middle in the vertical middle part 46A to fluidly communicate the pair of openings 38A and 39A in the right-left direction D1. The communication groove 62A is preferably formed at a position slightly away from the peripheral wall part 45A. The distance W2 between the peripheral wall part 45A and the communication groove 62A is the same as in the above-described embodiment.

Figure 9:
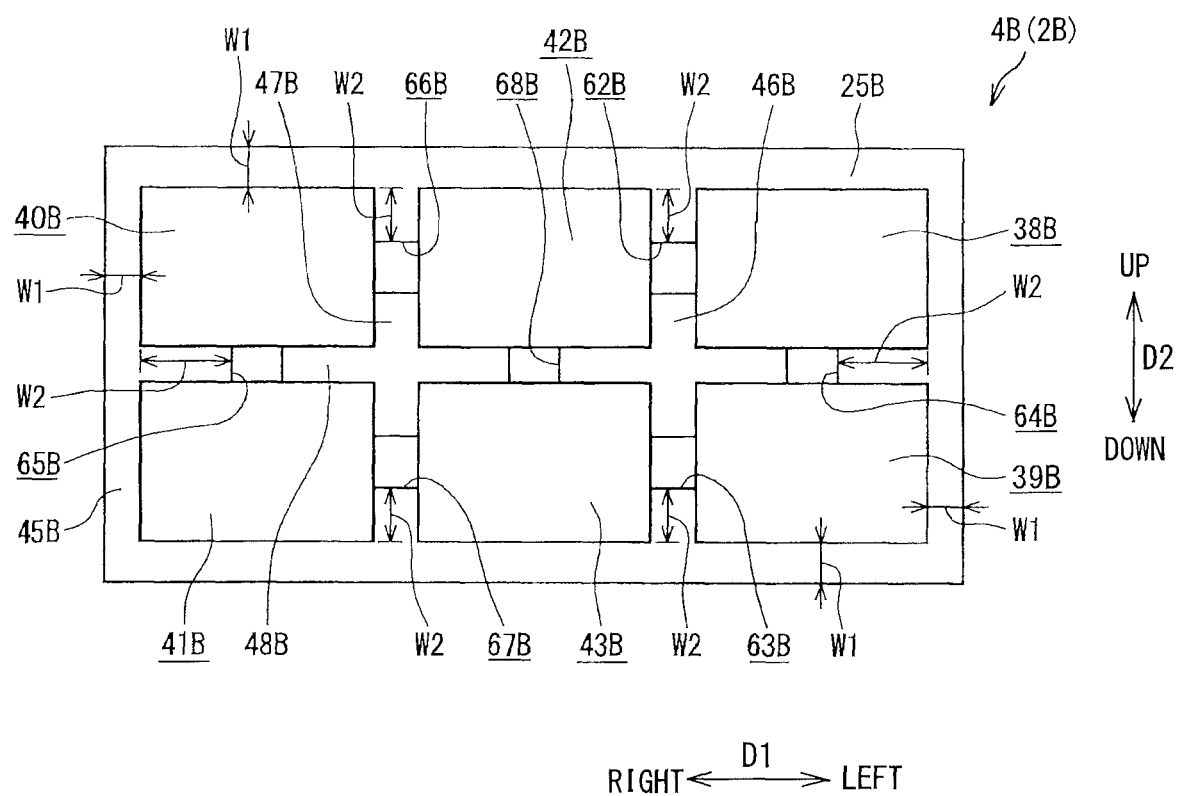
FIG. 9 is a front view of a base member of a lock fastener according to a second modification of the embodiment of the present invention.

Next, a lock fastener according to the second modification of the embodiment will be described with reference to FIG. 9. As shown in FIG. 9, the lock fastener 2B according to this modification includes a base member 4B having a front surface 25B formed with six openings 38B, 39B, 40B, 41B, 42B, 43B. The openings 38B to 43B are formed in a lattice arrangement at an inner side than peripheral edges of the front surface 25B. In other words, the front surface 25B of the base member 4B has a peripheral wall part 45B surrounding the openings 38B to 43B, vertical middle parts 46B, 47B extending in the up-down direction D2, and a horizontal middle part 48B extending in the right-left direction D1. The vertical middle parts 46B, 47B and the horizontal middle part 48B partition between the openings 38B to 43B.

That is, the openings 38B, 39B on the left side, the openings 42B, 43B in the middle, and the openings 40B, 41B on the right side are disposed away from one another in the right-left direction D1 with the vertical middle parts 46B, 47B in between. The openings 38B, 40B, 42B on the upper side and the openings 39B, 41B, 43B on the lower side are disposed away from one another in the up-down direction D2 with the horizontal middle part 48B in between.

The peripheral wall part 45B, the vertical middle parts 46B, 47B, and the horizontal middle part 48B are all flush with one another and function as the support wall part for supporting the rear surface 8b of the touch fastener 6 (FIG. 7(a)).

The peripheral wall part 45B is in a rectangular ring shape in the front view and extends continuously along the entire peripheral edges of the front surface 25B. The peripheral wall part 45B has the same width W1 as in the embodiment.

The front surface 25B of the base member 4B is also formed with communication grooves 62B, 63B, 64B, 65B, 66B, 67B. The communication groove 62B, 66B is formed at an upper part in the vertical middle part 46B, 47B, and the communication groove 63B, 67B is formed at a lower part in the vertical middle part 46B, 47B. The communication groove 64B is formed at a left part in the horizontal middle part 48B, and the communication groove 65B is formed at a right part in the horizontal middle part 48B, and the communication groove 68B is formed at a middle part in the horizontal middle part 48B. The openings 38B to 43B are in fluid communication with one another through the communication grooves 62B to 67B.

The communication grooves 62B to 67B are preferably formed at positions slightly away from the peripheral wall part 45B. The distance W2 between the peripheral wall part 45B and each communication groove 62B to 67B is the same as in the embodiment.

It should be noted that in a different embodiment the communication groove 65B is preferably dispensed with. In a still different embodiment, the communication groove 68B is preferably dispensed with.

Figure 10:
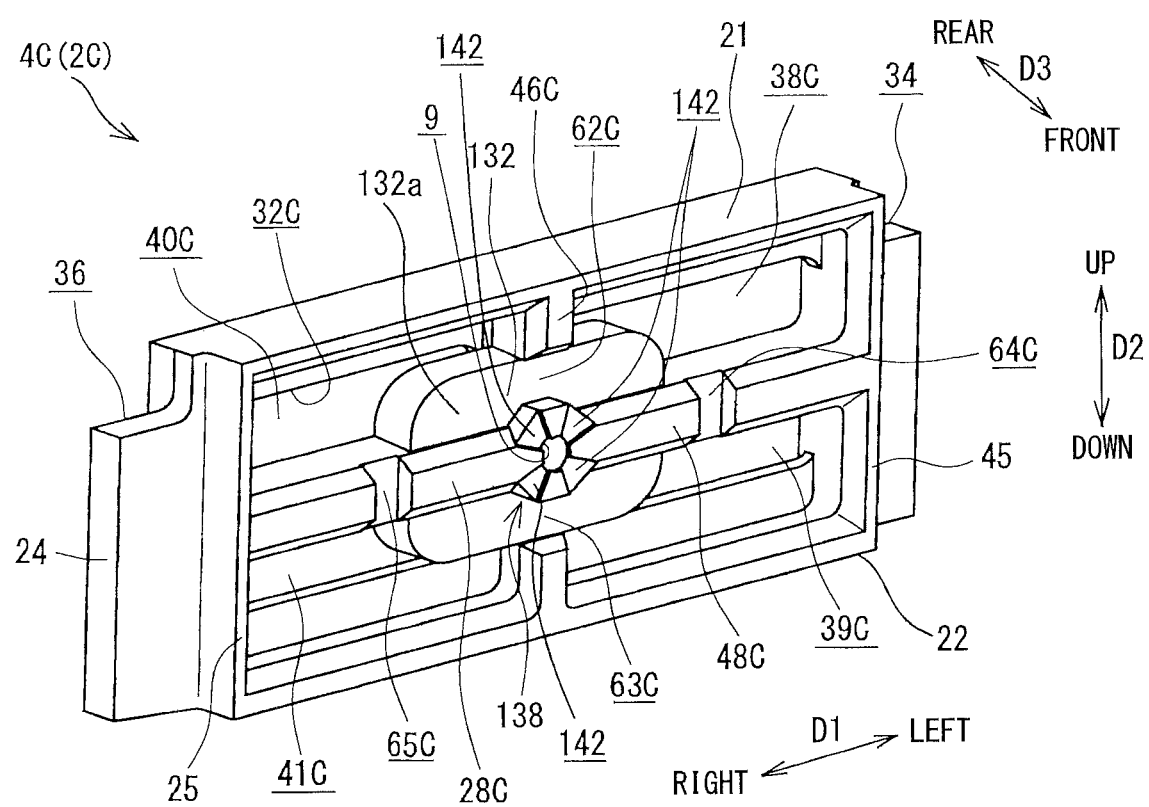
FIG. 10 is a perspective view of a base member of a lock fastener according to a third modification of the embodiment of the present invention as viewed from the front side.

Next, a lock fastener according to the third modification of the embodiment will be described with reference to FIGS. 10 to 12. As shown in FIG. 10, the lock fastener 2C according to this modification includes a base member 4C in a rectangular shape in the front view. The base member 4C has the upper surface 21, the lower surface 22, the left side surface 23, the right side surface 24, the front surface 25, and the rear surface 26 as the above-described base member 4.

Also, the base member 4C is formed with a space 32C and a pair of inlets 34, 36 in fluid communication with the space 32C.

As shown in FIG. 10, the front surface 25 of the base member 4C is formed with four openings 38C, 39C, 40C, 41C. The openings 38C to 41C are formed at an inner side than the peripheral edges of the front surface 25 and surrounded by the peripheral wall part 45.

In other words, the front surface 25 of the base member 4C has the peripheral wall part 45 surrounding the openings 38C to 41C, a vertical middle part 46C extending in the up-down direction D2, and a horizontal middle part 48C extending in the right-left direction D1. The vertical middle part 46C and the horizontal middle part 48C partition between the openings 38C to 41C.

That is, the opening 38C, 39C on the left side and the opening 40C, 41C on the right side are disposed away from each another in the right-left direction D1 with the vertical middle part 46C in between. The opening 38C, 40C on the upper side and the opening 39C, 41C on the lower side are disposed away from each other in the up-down direction D2 with the horizontal middle part 48C in between.

The peripheral wall part 45, the vertical middle part 46C, and the horizontal middle part 48C are all flush with one another and function as the support wall part for supporting the rear surface 8b of the touch fastener 6 (FIG. 7(a)).

The front surface 25 of the base member 4C is also formed with communication grooves 62C, 63C, 64C, 65C. The communication groove 62C is formed at an upper part in the vertical middle part 46C, and the communication groove 63C is formed at a lower part in the vertical middle part 46C. The communication groove 64C is formed at a left part in the horizontal middle part 48C, and the communication groove 65C is formed at a right part in the horizontal middle part 48C. The openings 38C to 41C are in fluid communication with one another through the communication grooves 62C to 65C.

Figure 11:
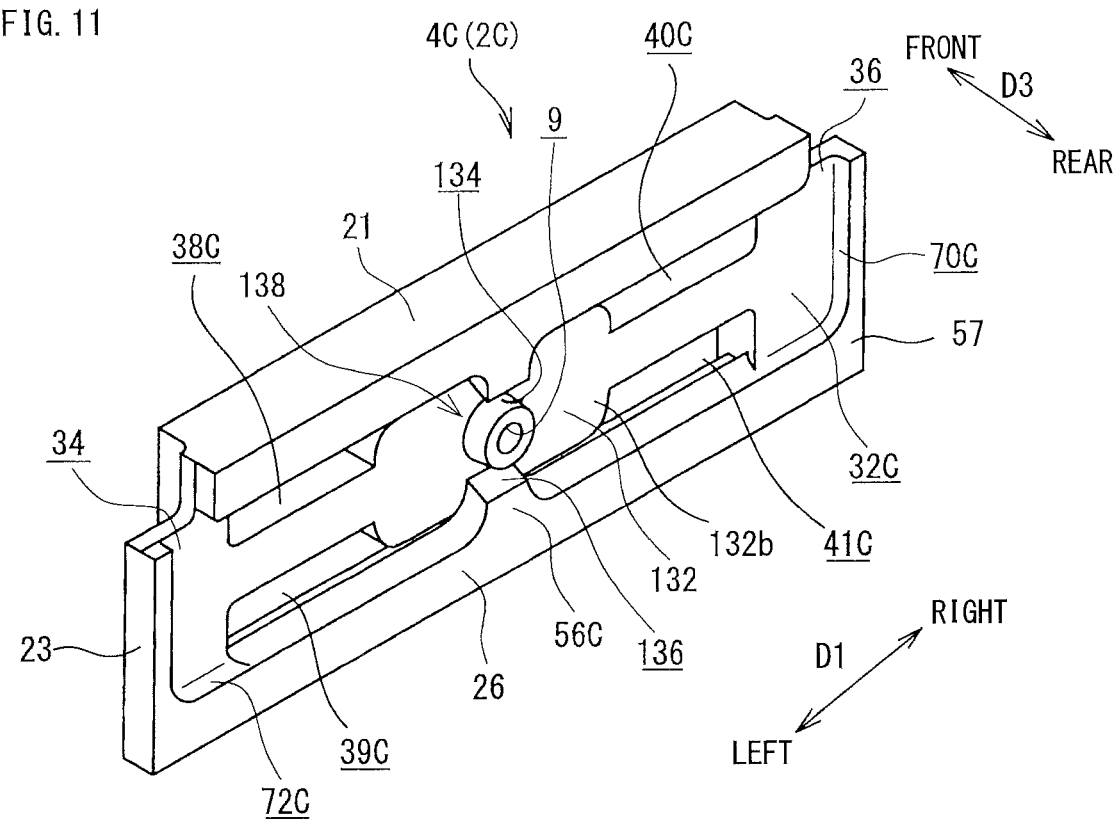
FIG. 11 is a perspective view of the base member of FIG. 10 as viewed from the rear side.

As shown in FIG. 11, the rear surface 26 of the base member 4C is formed with a pair of openings 70C, 72C. The opening 70C is opened to the openings 40C, 41C in the front-rear direction D3, and the opening 72C is opened to the openings 38C, 39C in the front-rear direction D3. The opening 70C is spaced away from the opening 72C in the right-left direction D1 with a vertical middle part 56C interposed therebetween. The vertical middle part 56C is formed with a pair of communication grooves 134 and 136 that fluidly communicate the openings 70C and 72C with each other.

The openings 38C to 41C, the communication grooves 62C to 65C, and the openings 70C and 72C together function as a space 32C. The base 8 of the touch fastener 6 is integrally joined to the front surface 25 of the base member 4C with the resin 5 filled and cured in the space 32C by insert molding described later.

Also, as shown in FIG. 10, the base member 4C is formed with an oval-shaped center wall part 132 at an intersection between the vertical middle part 46C and the horizontal middle part 48C. The center wall part 132 has a front surface 132a located rearward in the front-rear direction D3 than the front surface 25 of the base member 4C (i.e., the peripheral wall part 45, the vertical middle part 46C, and the horizontal middle part 48C of the front surface 25). That is, the front surface 25 of the base member 4C is located frontward than the center wall part 132. On the other hand, as shown in FIG. 11, a rear surface 132b of the center wall part 132 forms a bottom surface of the openings 70C and 72C, and thus the rear surface 26 of the base member 4C is located rearward than the rear surface 132b of the center wall part 132.

The base member 4C is also formed with a cylinder part 138 in the center of the center wall part 132. As shown in FIG. 10, the cylinder part 138 has a front end located frontward than the center wall part 132 and flush with the vertical middle part 46C and the horizontal middle part 48C. As shown in FIG. 11, the cylinder part 138 has also a rear end located rearward than the center wall part 132 and flush with the vertical middle part 56C and the peripheral wall part 57.

As shown in FIG. 11, the base member 4C is formed with an air-outlet hole 9 penetrating through the base member 4C in the front-rear direction D3 at the center of the cylinder part 138.

As shown in FIG. 10, the front end of the cylinder part 138 is formed with four grooves 142 radiating from the air outlet hole 9 and spaced apart from one another in a peripheral direction. The grooves 142 correspond to the openings 38C to 41C, are in fluid communication with the corresponding openings 38C to 41C, and function as air outlet channels for leading air in the openings 38C to 41C into the air outlet hole 9.

Figure 12:
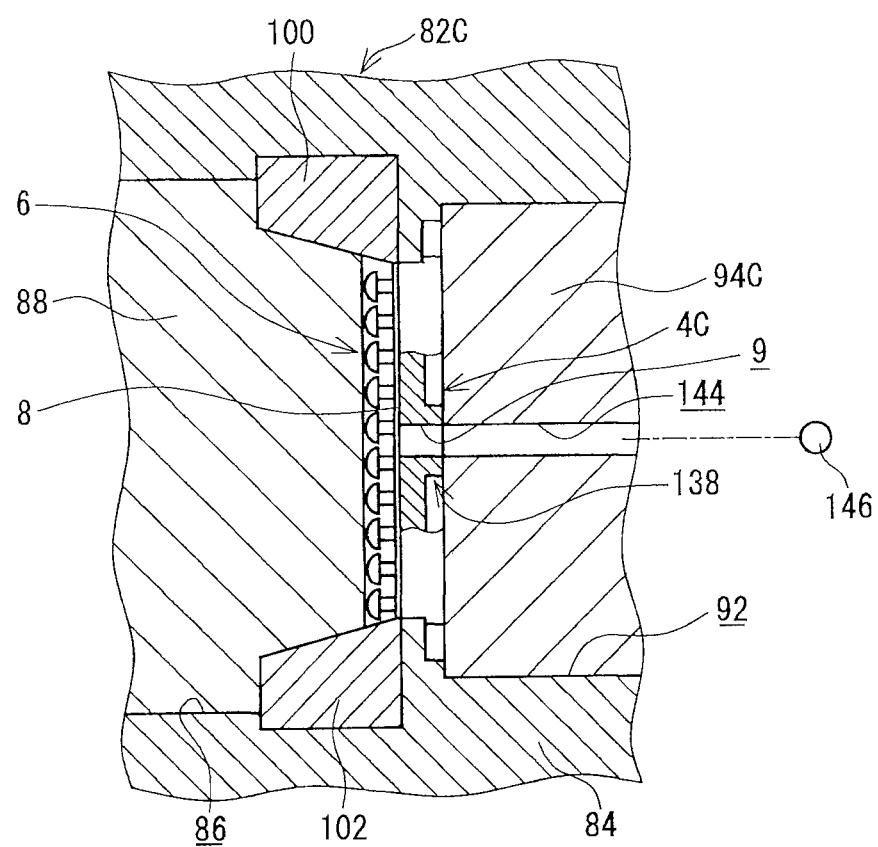
FIG. 12 is a cross-sectional view of a mold device for insert-molding the base member of FIG. 10 to the touch fastener.

For insert-molding the base member 4C to the touch fastener 6, a molding device 82C shown in FIG. 12, for example, is used. The molding device 82C has substantially the same configuration as the above-described molding device 82, but differs in including a second movable mold 94C instead of the second movable mold 94. The second movable mold 94C is formed with a suction channel 144 fluidly connected to a suction source 146 (e.g., pump).

As shown in FIG. 12, when the molding device 82C is closed with the base member 4C and the touch fastener 6 accommodated therein, then the front surface 25 of the base member 4C (more specifically, the peripheral wall part 45, the vertical middle part 46C, the horizontal middle part 48C, and the front end of the cylinder part 138 of the front surface 25 (all function as the support wall part)) abuts against the rear surface 8b of the base 8 of the touch fastener 6. At this time, while the front opening of the air outlet hole 9 is covered with the base 8 of the touch fastener 6, the rear opening of the air outlet hole 9 is connected to the suction channel 144 of the second movable mold 94C. Thus, the four openings 38C to 41C of the base member 4C is connected to the suction channel 144 through the grooves 142 and the air outlet hole 9 and further to the suction source 146.

In this state, the resin material is filled into the space 32C through the pair of inlets 34 and 36. In this manner, the base member 4C is insert-molded to the base 8 of the touch fastener 6. That is, the resin material injected through the inlets 34 and 36 flows through the openings 70C, 72C, 38C to 41C to the rear surface 8b of the base 8 of the touch fastener 6 and also into the communication grooves 62C to 65C, and then cures.

Also, in this modification, the suction source 146 is activated at the insert-molding such that air in the openings 38C to 41C flows through the grooves 142 (air outlet channels) to the air outlet hole 9 and is discharged through the suction channel 144. Thus, air does not remain between the injected resin material (resin 5) and the base 8 of the touch fastener 6, reliably insert-molding the base member 4C to the base 8 of the touch fastener 6.

In this modification also, as in the above-described embodiment, even if injection pressure fluctuates near the openings 38C to 41C, an excessively large pressure is not applied on parts of the base 8 of the touch fastener 6 because the resin material flows through the communication grooves 62C to 65C.

Figure 13:
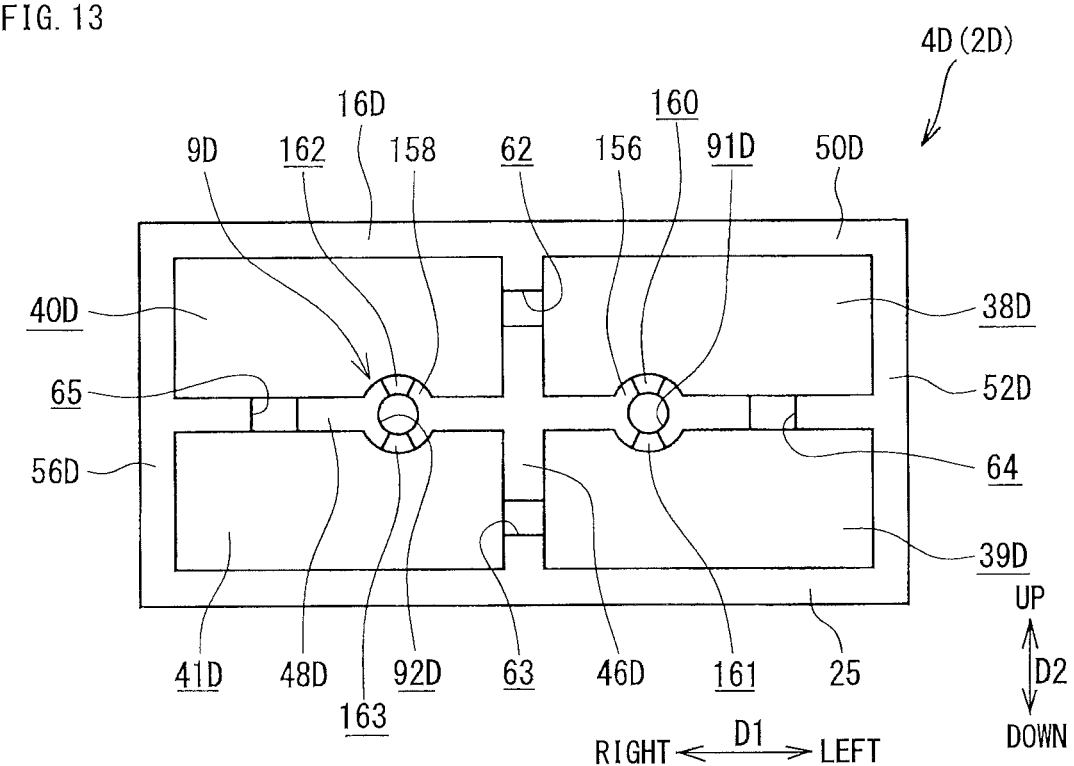
FIG. 13 is a front view of a base member of a lock fastener according to a fourth modification of the embodiment of the present invention.

Next, a lock fastener according to the fourth modification of the embodiment will be described with reference to FIG. 13. A lock fastener 2D according to this modification includes a base member 4D. The base member 4D has substantially the same configuration as the above-described base member 4, but differs in formed with openings 38D to 41D instead of the openings 38 to 41 in the front surface 25. The openings 38D to 41D are partitioned from one another with a vertical middle part 46D and a horizontal middle part 48D instead of the vertical middle part 46 and the horizontal middle part 48. The vertical middle part 46D is formed with the communication grooves 62 and 63 described above, and the horizontal middle part 48D is formed with the communication grooves 64 and 65 described above.

The base member 4D is also formed with a first cylinder part 156 at a left section of the horizontal middle part 48D of the front surface 25 and a second cylinder part 158 at a right section of the horizontal middle part 48D. Further, the base member 4D is formed with air outlet holes 9D penetrating through the base member 4D in the front-rear direction D3. In this modification, the air outlet holes 9D include a first air outlet hole 91D formed at the first cylinder part 156 and a second air outlet hole 92D formed at the second cylinder part 158.

It should be noted that in a different embodiment the first and second cylinder parts 156 and 158 are dispensed with, and the first and second air outlet holes 91D and 92D are formed directly at the horizontal middle part 48D.

The first cylinder part 156 has a front end formed with a pair of first grooves 160 and 161 (function as air outlet channels) respectively corresponding to the openings 38D and 39D adjacent thereto in the up-down direction D2. The first groove 160 on the upper side fluidly communicates the opening 38D on the upper left side to the first air outlet hole 91D, and the first groove 161 on the lower side fluidly communicates the opening 39D on the lower left side to the first air outlet hole 91D. The second cylinder part 158 has a front end formed with a pair of second grooves 162 and 163 (function as air outlet channels) respectively corresponding to the openings 40D and 41D adjacent thereto in the up-down direction D2. The second groove 162 on the upper side fluidly communicates the opening 40D on the upper right side to the second air outlet hole 92D, and the second groove 163 on the lower side fluidly communicates the opening 41D on the lower right side to the second air outlet hole 92D.

Although not shown in the drawings, the first and second air outlet holes 91D and 92D are adapted to be connected to a suction source through first and second suction channels, respectively, formed in a second movable mold of a mold device at the time of insert molding, for example. When the suction source is activated, then air in the openings 38D and 39D of the base member 4D flows through the pair of first grooves 160 and 161 into the first air outlet hole 91D and is discharged outside through the first air outlet hole 91D. Also, air in the openings 40D and 41D of the base member 4D flows through the pair of second grooves 162 and 163 into the second air outlet hole 92D and is discharged outside through the second air outlet hole 92D. Thus, the same advantageous effects as in the third modification are achieved.

It should be noted that although the first cylinder part 156 is formed between the openings 38D and 39D on the left side and the second cylinder part 158 is formed between the openings 40D and 41D on the right side in this fourth modification, it is preferable in a different embodiment that the first cylinder part 156 with the first air outlet hole 91D penetrating therethrough be formed at an upper section of the vertical middle part 46D and that the second cylinder part 158 with the second air outlet hole 92D penetrating therethrough be formed at a lower section of the vertical middle part 46D. In this case, the front end of the first cylinder part 156 is formed with the pair of first grooves 160 and 161 in fluid communication with the openings 38D, 40D adjacent thereto in the right-left direction D1, and the front end of the second cylinder part 158 is formed with the pair of second grooves 162 and 163 in fluid communication with the openings 39D and 41D adjacent thereto in the right-left direction D1. This configuration also provides the same advantageous effects as in the fourth modification.

While the lock fasteners according to the invention have been described in detail with reference to the embodiment and modifications thereof, it would be apparent to those skilled in the art that various changes and modifications may be made therein without departing from the spirit of the invention.

INDUSTRIAL APPLICABILITY

Lock fasteners according to the invention are especially suitable for lining sheet materials to vehicles.

EXPLANATION OF REFERENCES 2, 2A, 2B, 2C, 2D lock fastener
4, 4A, 4B, 4C, 4D base member
6 touch fastener
8 base
10 engaging members
25 front surface
32 space
38-41, 38A-41A, 38B-43B, 38C-41C, 38D-41D opening
45 peripheral wall part
5 resin
62-65, 62A, 62B-68B, 62C-64C communication groove

What is claimed is:

1. A lock fastener comprising:
a base member; and
a touch fastener including a base and a plurality of engaging members, the base having a first surface and a second surface, the plurality of engaging members being formed on the first surface of the base, wherein:
the base member has been insert-molded integrally with the base using a resin;
the base member has a surface formed with an opening and having a peripheral wall part extending continuously along entire outer peripheral edges of the surface, the peripheral wall part surrounding the opening;
the base member is formed with a space configured to be filled with the resin at the time of insert-molding, the space including the opening; and
the surface of the base member and the second surface of the base of the touch fastener are joined together with the resin filled in the space, and the peripheral wall part of the surface of the base member is in abutment with the second surface of the base of the touch fastener at the time of the insert-molding and is configured to serve as a bank for preventing the resin filled into the space from leaking at the time of the insert-molding.

2. The lock fastener according to claim 1, wherein a width of the peripheral wall part is between 0.01 mm and 5.0 mm.

3. A lock fastener comprising:
a base member having a surface formed with a plurality of openings and at least one communication groove, the plurality of openings including a pair of openings connected with each other through the at least one communication groove; and
a touch fastener including a base and a plurality of engaging members, the base having a first surface and a second surface, the plurality of engaging members being formed on the first surface of the base, wherein:
the base member has been insert-molded integrally with the base using a resin;
the base member is formed with a space configured to be filled with the resin at the time of insert-molding, the space including the plurality of openings; and
the surface of the base member and the second surface of the base of the touch fastener are in contact with each other and joined together with the resin filled in the space.

4. The lock fastener according to claim 3, wherein all of the plurality of openings are in fluid communication with one another through the at least one communication groove; and
the surface of the base member has a middle part partitioning between the plurality of openings and supporting the second surface of the base of the touch fastener.

5. The lock fastener according to claim 4, wherein:
the plurality of openings is four rectangular-shaped openings formed inward of peripheral edges of the surface in a lattice arrangement.

6. The lock fastener according to claim 3, wherein:
the surface of the base member is formed with a plurality of air-discharge channels corresponding to the plurality of openings;
the base member is formed with an air outlet hole penetrating through the base member, the air outlet hole being in a fluid communication with the plurality of openings through the plurality of air-discharge channels; and
the plurality of openings and the plurality of air-discharge channels are configured such that, at the insert molding, air in the plurality of openings flows through the plurality of air-discharge channels into the air outlet hole.

7. A lock fastener comprising:
a base member having a surface formed with at least one opening and at least one air-discharge channel; and
a touch fastener including a base and a plurality of engaging members, the base having a first surface and a second surface, the plurality of engaging members being formed on the first surface of the base, wherein:
the base member has been insert-molded integrally with the base using a resin;
the base member is formed with at least one air outlet hole and a space, the at least one air outlet hole penetrating through the base member and connected to the at least one opening through the at least one air-discharge channel, the space including the at least one opening, the space being configured to be filled with the resin at the time of insert-molding, and the space and the at least one air outlet hole being configured to allow air in the at least one opening to flow through the at least one air-discharge channel into the at least one air outlet hole at the time of the insert-molding; and
the surface of the base member and the second surface of the base of the touch fastener are in contact with each other and joined together with the resin filled in the space.

8. The lock fastener according to claim 7, wherein:
the at least one opening includes four openings in a lattice arrangement;
the surface of the base member has a peripheral wall part, a vertical middle part, and a horizontal middle part, the peripheral wall part extending continuously along entire peripheral edges of the surface, the peripheral wall part surrounding the four openings, the vertical middle part and the horizontal middle part partitioning between the four openings;
the peripheral wall part, the vertical middle part, and the horizontal middle part are all flush with one another and support the second surface of the base of the touch fastener; and
the at least one air-outlet hole includes an air-outlet hole formed at a center of the four openings.

9. The lock fastener according to claim 7, wherein:
the at least one opening includes four openings in a lattice arrangement, the four openings including a pair of first openings located adjacent to each other and a pair of second openings located adjacent to each other;
the surface of the base member has a peripheral wall part, a vertical middle part, and a horizontal middle part, the peripheral wall part extending continuously along entire peripheral edges of the surface, the peripheral wall part surrounding the four openings, the vertical middle part and the horizontal middle part partitioning between the four openings;

the peripheral wall part, the vertical middle part, and the horizontal middle part are all flush with one another and support the second surface of base of the touch fastener;

the at least one air-outlet hole includes a first air-outlet hole corresponding to the pair of first openings and a second air-outlet hole corresponding to the pair of second openings; and at the time of insert molding, air in the pair of first openings flows into the first air-outlet hole, and air in the pair of second openings flows into the second air-outlet hole.

10. The lock fastener according to claim 7, wherein the at least one air-outlet hole is configured to be fluidly connected to an external vacuum source through a vacuum channel formed in a mold at the time of insert molding.

11. A lock fastener comprising:

a base member having a surface formed with a plurality of openings, at least one communication groove, and at least one air-discharge channel, the plurality of openings including a pair of openings connected with each other through the at least one communication groove; and a touch fastener including a base and a plurality of engaging members, the base having a first surface and a second surface, the plurality of engaging members being formed on the first surface of the base, wherein:

the base member has been insert-molded integrally with the base using a resin;

the surface formed with the plurality of openings has a peripheral wall part extending continuously along entire outer peripheral edges of the surface, the peripheral wall part surrounding the plurality of openings;

the base member is formed with at least one air outlet hole and a space, the at least one air outlet hole penetrating through the base member and connected to the plurality of openings through the at least one air-discharge channel, the space including the plurality of openings, the space being configured to be filled with the resin at the time of insert-molding, and the space and the at least one air outlet hole being configured to allow air in the plurality of openings to flow through the at least one air-discharge channel into the at least one air outlet hole at the time of the insert-molding; and the surface of the base member and the second surface of the base of the touch fastener are in contact with each other and joined together with the resin filled in the space, and the peripheral wall part of the surface of the base member is in abutment with the second surface of the base of the touch fastener at the time of the insert-molding and is configured to serve as a bank for preventing the resin filled into the space from leaking at the time of the insert-molding.

\* \* \* \* \*